United States Patent [19]

Thomson et al.

[11] Patent Number: 4,894,660

[45] Date of Patent: Jan. 16, 1990

[54] RANGE SIDELOBE REDUCTION BY APERIODIC SWEPT-FREQUENCY SUBPULSES

[75] Inventors: Don N. Thomson, Haddonfield; David E. Maron, Marlton, both of N.J.

[73] Assignee: General Electric Company, Moorestown, N.J.

[21] Appl. No.: 256,681

[22] Filed: Oct. 12, 1988

[51] Int. Cl.[4] ............... G01S 13/26; G01S 13/30; G01S 13/38

[52] U.S. Cl. .................... 342/129; 342/159; 342/137; 342/201

[58] Field of Search ............... 342/127–129, 342/134, 137, 159, 201

[56]  References Cited

U.S. PATENT DOCUMENTS

| | | | |
|---|---|---|---|
| 4,047,171 | 9/1977 | Fugit | 342/51 |
| 4,047,172 | 9/1977 | Bauer et al. | 342/91 |
| 4,095,225 | 6/1978 | Erikmats | 342/195 |
| 4,309,703 | 1/1982 | Blahut | 342/201 |
| 4,353,067 | 10/1982 | Mims | 342/201 |
| 4,375,641 | 3/1983 | Josefsson et al. | 342/88 |
| 4,495,501 | 1/1985 | Creed | 342/160 |
| 4,524,363 | 6/1985 | Kretschmer | 342/201 |
| 4,566,010 | 1/1986 | Collins | 342/379 |
| 4,586,044 | 4/1986 | Hopwood et al. | 342/202 |
| 4,626,854 | 12/1986 | Kretschmer, Jr. et al. | 342/196 |
| 4,635,279 | 1/1987 | Nossen | 375/78 |
| 4,644,356 | 2/1987 | Yamano | 342/160 |
| 4,719,468 | 1/1988 | Jehle et al. | 342/201 |
| 4,727,375 | 2/1988 | Lacomme | 342/91 |
| 4,739,331 | 4/1988 | Pincoffs et al. | 342/175 |
| 4,749,995 | 6/1988 | Hopwood et al. | 342/371 |
| 4,750,145 | 6/1988 | Leavitt | 364/726 |

OTHER PUBLICATIONS

"Frequency-Jumped Burst Waveforms" published in the Proceedings of the IEE/IEEE RADAR '87, 1987 International Radar Conference, London, U.K. Oct. 19–21, 1987.

*Primary Examiner*—Thomas H. Tarcza
*Assistant Examiner*—John B. Sotomayor
*Attorney, Agent, or Firm*—William H. Meise

[57] ABSTRACT

A swept-frequency radar system transmits pulses consisting of swept-frequency subpulses of nonuniform duration separated by short nontransmitting periods during which an array antenna is resteered. The pulses reflected from a target are processed by a method including estimating the target ranges, producing a reference signal at the time at which the pulse reflected from the target is expected to return. The reflected pulse is phase detected by means of the reference pulse to produce phase detected signals which include information relating to the error between the actual range and the estimated range. The phase detected signals are Fourier transformed to produce range error information. The nonuniform subpulse durations reduce the magnitude of range sidelobes.

12 Claims, 11 Drawing Sheets

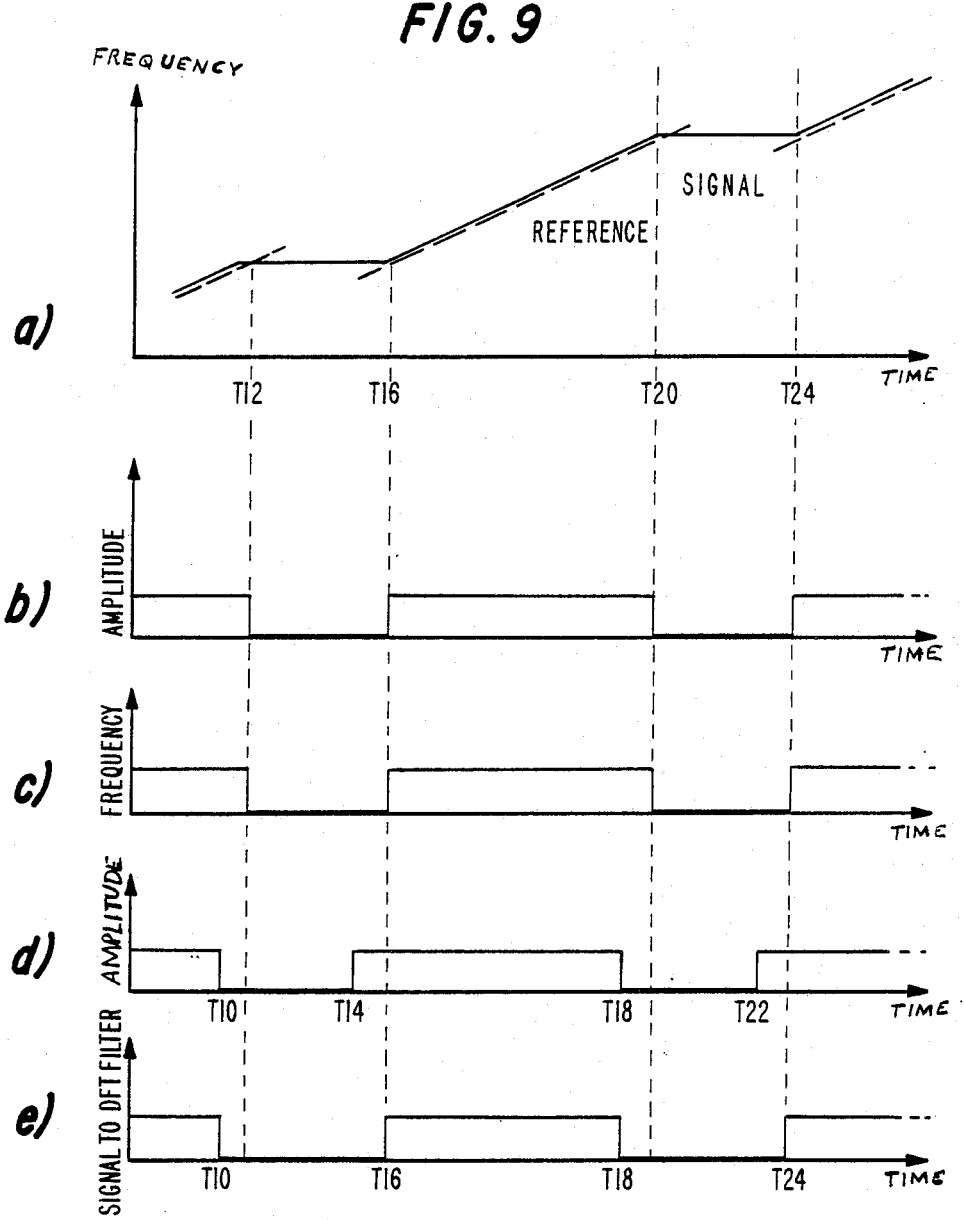

RANGE SIDELOBE REDUCTION BY APERIODIC SWEPT-FREQUENCY SUBPULSES

BACKGROUND OF THE INVENTION

This invention relates to swept-frequency radars in which the subpulse duration is width-modulated to reduce range sidelobes. These sidelobes can obscure targets, or be interpreted as spurious targets.

Radar systems are in widespread use for military, civilian and scientific applications. In radar systems, the direction (such as the azimuth or elevation) of a target is determined by the direction in which the radar antenna is pointed at the time it acquires the target. Thus, the location portion of the information depends in great part upon the accuracy with which the pointing direction of the antenna can be established.

The range of a target from the radar system is determined by the length of time required for a round trip of the signal between the radar transmitter and the target. The maximum distance at which a radar system can sense a target depends upon the power transmitted in each pulse. The maximum or peak power which can be transmitted depends upon many factors, including the type of active device(s) used in the transmitter. It has been found that at a given peak power, the maximum range at which a target can be sensed is increased if the pulse duration is increased, because the transmitted energy thereby also increases. However, in a single-frequency radar system, increasing the pulse width effects a reduction in the minimum distance at which a target can be tracked, and also reduces the accuracy of the range determination.

The swept-frequency radar system overcomes the limitation of reduced range resolution resulting from an extended transmitted pulse. In the swept-frequency system, the frequency of the transmitter is swept (monotonically changed) during the relatively long transmitter pulse. The duration of the dwell of the transmitted pulse at any frequency is very small. The use of pulse compression techniques at the receiver gives the effect of a short transmitter pulse as to range resolution and of a long transmitter pulse as to maximum range.

FIG. 1 illustrates an array antenna arrangement 6. In FIG. 1, elements 10, 12, 14 and 16 of antenna 6 represent substantially omnidirectional antenna elements arranged in a spaced line array 8, where the distance between elements (S) is less than one-half wavelength ($\lambda/2$) at all frequencies of interest. Antenna 6 includes controllable phase shifter ($\Delta\phi$) 20 connected to antenna 10, and controllable phase shifters 22, 24 and 26 connected to antenna elements 12, 14 and 16 respectively. Phase shifters 20-26 are coupled to an adder/splitter illustrated as a block 28, which has a common terminal 30.

As known, antennas are normally considered to be passive reciprocal devices, in which the transmitting and receiving functions are reciprocals of one another, and in which the antenna pattern when receiving is the same as the radiation pattern in a transmission mode. Very often, the description of the operation of an antenna is couched in terms of only transmission or reception, the reciprocal operation being understood.

In FIG. 1, array 8 of antenna elements 10-16 is illustrated as receiving a plane wave front 18 traveling toward the array at an angle theta ($\theta$) relative to the horizontal. At the moment shown, wavefront 18 is just arriving at antenna 10, but is at a perpendicular distance L from antenna element 16. Wave front 18 will arrive in succession at antenna elements 12, 14 and 16. Thus, assuming negligible delay in the phase shifters, a signal is produced at the output of phase shifter 20 at the instant illustrated in FIG. 1, and is not produced at the output of phase shifter 26 until a time L/C later, where C is the speed of light. The signals from phase shifters 20-26 are applied to inputs of an adder/splitter (adder for reception, splitter for transmission) 28 where they are vectorially summed or superposed to produce a net received signal at a common input/output port 30. The distance L may be calculated from the equation $L = NS \sin\theta$, where N is the number of interelement spacings, S is the interelement spacing, and $\theta$ is the angle illustrated in FIG. 1. In order to superimpose or sum the signal resulting from wavefront 18, phase shifter 20 requires zero phase shift, but phase shifter 26 requires a phase shift of $2\pi L/\lambda$, which is the same as $2\pi NS \sin\theta/\lambda$.

Array antennas such as antenna 6 described in conjunction with FIG. 1 are very desirable for modern radar systems because they may resteered by simply adjusting the phase shift of the phase shifters therein, without the need for mechanical motion. Thus, it is desirable to use a phase-shifter controlled steerable array antenna with a swept-frequency radar system. A swept-frequency pulse is illustrated in the frequency-time plot of FIG. 2, in which plots 31 illustrate pulses of transmitted power with monotonically increasing frequency. The transmitted pulses occur between recurrent times T0-T100 (where the hyphen is equivalent to the word "to"), and are reflected from, and returned from the targets to the, radar system for detection in the remaining intervals T100-T0.

The frequency sweep gives rise to a problem when used with an array antenna. Ideally, elements 20, 22, 24 and 26 of FIG. 1 are simple delay elements such as a length of transmission (TX) line, which provides the same delay at all frequencies. At the present state of the art, variable delay elements are expensive and difficult to construct. Consequently, less expensive variable phase shifters are used, which are perfectly adequate when a fixed frequency is transduced by the antenna. However, phase shifters have a delay which changes with frequency. Because of the use of phase shifters rather than delay elements for controlling the direction of steering of the antenna, the antenna can be correctly steered or pointed at only one frequency at a time. The frequency at which the antenna pointing direction is calculated is selected near the center of the range of swept frequencies of the radar system, but the actual direction of transmission or reception of the array antenna will change as the frequency is swept. The error in pointing direction increases as the number of elements in the antenna array grows and also increases as the frequency bandwidth of the swept transmitter pulse increases. Thus, the errors in the pointing directions of the array antenna may be reduced by limiting the bandwidth of the frequency sweep, and by limiting the size of the antenna. If the frequency bandwidth is to be small in order to limit pointing errors, either the maximum duration of the pulse must be limited, thereby reducing the average power and the useful range, or the range resolution must be limited because of a longer dwell at each frequency. Reducing the pointing error by limiting the size of the antenna reduces the antenna gain and the angular resolution.

FIG. 3 illustrates an arrangement wich allows a relatively large array antenna for high gain, but in which the pointing error resulting from a frequency sweep is reduced. Elements of FIG. 3 corresponding to those of FIG. 1 are designated by the same reference numerals. In FIG. 3, antenna 6 of FIG. 1 is illustrated as having its input/output port 30 connected to a controllable delay line 32 such as a switchable tapped delay line. Further antennas 34, 34' and 34" similar to antenna 6 of FIG. 1 are illustrated as being similarly connected to controllable delay elements 36, 36' and 36", respectively. Thus, each antenna array 6 or 34 is a subarray of the array of FIG. 3. Controllable delay elements 32 and 36-36"are connected to an adder/splitter 38 having a common port 40. Delay elements 32 and 36 have a delay which is invariant with frequency, and therefore the sweep of the transmitter pulse does not affect the pointing direction of the overall array, although each individual subarray antenna such as 6, 34, 34', 34"... may sweep its pointing direction, resulting in some error in the pointing direction of the arrangement of FIG. 3. The arrangement of FIG. 3 is a good compromise between cost and performance, since relatively few of the expensive controllable delay elements are required, and yet the error in pointing direction resulting from a frequency sweep of the transmitter pulse is limited.

Greater pointing accuracy may be maintained or achieved with wideband waveformsif a given swept-frequency transmitter pulse is broken up into a plurality of shorter subpulses, separated from one another by short nontransmitting periods during which the antenna subarrays are resteered to point in the selected direction at a frequency near the center of the next following swept-frequency subpulse. FIG. 4 illustrates a portion of such a pulse. With such a system the expensive time delay elements can be completely avoided.

In FIG. 4, a first straight-line portion 50 represents a subpulse with frequency increasing linearly from a frequency f0 to a frequency f2 in the interval T0-T2. In the interval T2-T4, no transmission occurs and the array is resteered to point in the selected direction at a frequency f3, midway between frequencies f2 and f4. In this context, resteering means selecting the values of phase shift of the phase shifters (such as 20-26 of FIG. 1) so that at the selected frequency (f3 in the example) the phase shifts provide the desired pointing direction. The phase shifts may either be calculated or extracted from a memory (not illustrated). Beginning at time T4, a further line 52 parallel to line 50 in FIG. 4 represents a further subpulse with a frequency sweep from frequency f2 to f4 over the interval T4-T6. Time interval T4-T6 equals interval T0-T2. As the frequency sweeps from frequency f2 through frequency f3 to f4, the antenna pointing direction sweeps through the desired direction, being exactly correct at frequency f3.

Time interval T6-T8 represents a further nontransmitting time during which the antenna is resteered to the selected direction at a frequency midway between f4 and f6, following which transmission of another subpulse occurs, sweeping the frequency from f4 to f6 over the interval T8-T10. The frequency excursions f0-f2, f2-f4, f4-f6 are selected to be small enough so that significant pointing error does not occur over the frequency range. The rate of change of frequency is selected to provide the desired range resolution. The total number of transmitter subpulses such as those represented by 50, 52 and 56 which occur in one transmitter pulse are selected in accordance with the amount of transmitted power which is desired, since additional subpulses increase the pulse duration and therefore the transmitted power per pulse.

It should be noted that the same frequency occurs at the end of each transmitter subpulse interval and at the beginning of the next following subpulse. For example, the frequency is f2 at time T2 in FIG. 4, which in the end of the first subpulse 50, and is also f2 at the following time T4, the beginning of the second subpulse 52. It is desirable that phase coherence be maintained in the interval T2-T4, so that the phase of the transmitter cycle at time T4 is the same as that at time T2. It is not necessary for the nontransmitting period to be an exact multiple of the period of the f2 frequency, because digital signal processing allows the end of one transmission to be "stitched" or connected to the beginning of the next, in effect eliminating the intervening time.

FIG. 5 shows one form of pulse compression receiver which can be used when the time of the received pulse is known. The approximate time at which a pulse will return may be determined by operating the radar system in a conventional mode with reduced bandwidth, without resteering and with a conventional SAW filter pulse compression circuit to establish the approximate range. Once the approximate range is known, the waveform of FIG. 4 is used, with resteering and with the receiver of FIG. 5.

FIG. 5 illustrates, in simplified block diagram form, a receiver for receiving the reflection from a target illuminated by a transmitted pulse such as that of FIGS. 2 or 4. In FIG. 5, antenna 506 receives the reflected pulse, i.e., the waveform of FIGS. 2 or 4, as appropriate. It should be noted that antenna 506 is not necessarily the same antenna as that by which the pulse was originally transmitted. The received signal is coupled from antenna 506 over a conductor 510 to an RF amplifier 520, which amplifies the signal and applies it to a phase detector 530, which also receives a reference waveform over a conductor 570. The reference waveform is a delayed replica of the transmitted pulse, except that the reference subpulses are slightly wider than the transmitted subpulses, as described in detail below. Phase detector 530 responds by producing I (in-phase) and Q (quadrature-phase) signals, which are separately applied to an analog-to-digital converter (ADC).

The I and Q outputs of ADC 540 are applied over conductors 551 and 553, respectively, as inputs to arrays of gates 550 and 552, respectively, of a digital Fourier transform (DFT) 560. As illustrated in FIG. 5, there are 2N+1 gates designated 550, namely gates $550^{-N}$... $550^{\circ}$... $550N^{-1}$, $550^{N}$ for gating the I waveform. Similarly, there are 2N+1 gates designated 552, namely $552^{-N}$... $552^{\circ}$:... $552N^{-1}$, $552^{N}$. Gate arrays 550 and 552 gate the I and Q componnnts, respectively, of the phase detected received signal to arrays of vector multipliers 554, the outputs of which are coupled to an array of integrators ($\int$) 556. The outputs of all integrators 556 are applied to the inputs of a commutator 558, which sequentially couples the outputs to a conductor set 562.

Each set of gates 550, 552, and the associated vector multiplier 554 and integrator 556 comprises a filter for one return frequency, as described below. For example, the I signal applied over conductor 551 to all gates 550 is gated by gate 550° to an input of vector multiplier 554° if the return occurs at the time at which the gating signal is also applied to gate 550°, and otherwise the signal is not applied to vector multiplier 554°, but may be applied to one of the other vector multipliers.

The gating pulses or signals for gates 550 and 552 originate at terminal 570 of FIG. 5 and are applied directly to gates $550^{-N}$ and $552^{-N}$ for enabling these gates first. The gating pulses flow from terminal 570 to a delay element $564-N$ which delays the gating signal for an incremental time, following which the delayed gating signal is applied to enable the next gates 550, 552 (not illustrated). The delay of the gating signal continues, and eventually the delay is provided by incremental delay element 564°, from which the gate pulse is applied to enable gate 550° and 552°. The delay continues in this fashion, enabling those gates between 550°, 552° and $550^{N-1}$ and $552^{N-1}$ in succession. Finally, delay element $564^{N-1}$ delays the enable gate pulses for application to gates $550^{N-1}$ and $552^{N-1}$, and delay element $564^N$ provides a further incremental delay before applying the gate pulse to the last set of gates to be enabled, gates $550^N$ and $552^N$ The delay between the time of transmission of the pulse and the time of application of the reference waveform to phase detector 530 is a coarse indicator of the range of the target. In particular, the round-trip delay is 12.4 microseconds per mile of range. If the reference waveform is applied at exactly the right time (i.e., the beginning of the delayed reference pulse coincides exactly with the beginning of reception of the pulse reflected from the target), the target is not moving, and there are no resteering periods (i.e., the transmitted and reference waveforms correspond to the FIG. 2 waveform), the output of phase detector 530 is a direct voltage. The direct voltage represents zero frequency, which indicates that there is no difference between the time of the reference waveform and the time for the signal to make a round trip to the target. In other words, the difference between the actual range and the coarse range estimate is zero.

The direct voltages produced by phase detector 530, in response to a reference waveform which is identical, arrives at gates 550, 552 at exactly the expected time. The timing of the radar system of FIG. 5 is selected so that the time of arrival of a signal corresponding exactly to the coarse range estimate is the time at which gates 550°: and 552°: are enabled. These gates are enabled in the center of the times enabled in succession by the enable gate applied to terminal 570, so that either positive or negative errors in the coarse range estimate will result in times of arrival which coincide with the opening of one of the gate sets 550, 552. In the particular case when the error in the coarse range estimate is zero and a direct voltage is therefore produced by phase detector 530, DFT 560 produces on conductor 562 a maximum response at a frequency of zero, thereby providing the desired range information.

If the waveform of FIG. 2 is transmitted, and there are therefore no resteering intervals, and the coarse range estimate is in error, the reference waveform will be applied to phase detector 530 either slightly before or slightly after the time of arrival of the signal reflected from the target. The situation is illustrated in FIG. 6, which is a frequency-time plot. In FIG. 6, 610 represents a swept-frequency transmitter pulse occurring in the interval T0-T2. The reflected signal is represented by waveform 612, which is received by antenna 506 (FIG. 5) beginning at time T4 (FIG. 6), and extending to time T8. Ideally, the widened reference waveform 614 applied by way of conductor 570 to phase detector 530 would occur so as to be centered relative to waveform 612, but because of an error in the coarse range estimate, the reference does not begin until a later time such that it crosses frequency f0 at time T6. Consequently, there is a constant frequency difference between the reference and reflected signals. This difference is illustrated as f2-f4 at time T7 in FIG. 6. However, the frequency difference remains constant over much of the waveform. This frequency difference is manifested at the output of phase detector 530 of FIG. 5, and when gated to DFT 560 produces a maximum at a frequency representative of the error between the coarse range estimate and the actual range.

As illustrated in FIG. 6, the coarse range estimate of the target was too distant, so the reference waveform 614 is generated at a time later than the actual return from the target. In this context, "later" means that the reference waveform is generated over a period of time such that the occurrence of any frequency such as f2 occurs later than the return of f2 from the target. The target return is effectively earlier than the reference. The magnitude of the frequency difference between the reference waveform 614 and the return 612 from the target increases with an increase in the coarse range error. Thus, the earlier the return arrives from the target, the larger its frequency error. The earliest-arriving target will therefore have largest frequency error manifested in the signal at the output of phase detector 530. This signal is gated to all of the filters formed by a set of gates 550, 552, vector multiplier 554 and integrator 556 (FIG. 5); the maximum output is produced in the filter matched to the difference frequency.

Each vector multiplier $554^{-N}\ldots 554^{\circ}\ldots 554^{N-1}$, $554^N$ receives I and Q target return inputs from corresponding gates 550, 552, respectively, gated at times corresponding to the time at which they arrive. Each vector multiplier performs complex multiplication of the target return inputs by filter coefficients and the resulting product is integrated ($\int$) by an integrator illustrated as a block 556. The outputs of integrators $556^{-N}\ldots 556^{\circ}\ldots 556^{N-1}$, $556^N$ are sequentially commutated to produce signals representative of the error between the coarse angle estimate and the actual range.

If the target is moving, the motion introduces a Doppler frequency shift to the returned signal. The effects of an error in the coarse range estimate can be separated from the effects of motion of the target by reversing the direction of frequency sweep on alternate transmitter pulses (positive frequency slope during one pulse, negative frequency slope during the next). Thus, range error information may be separated from range rate due to target motion for separate processing. This is performed in the tracking computer described below.

In the arrangement as described in conjunction with FIGS. 5 and 6, the range error resolution is inversely proportional to the bandwidth of the frequency sweep. Since the time at which the signal at a particular frequency returns is known, an amplitude weighting may be imposed by reducing the amplitude of the received signal near the beginning and end of the interval during which it is received, to aid in reducing the amplitude of range sidelobes. Since the time of receipt of the signal may vary somewhat within each range cell, the weighting ideally should track the received signal in time to prevent degradation of the signal-to-noise ratio (S/N or SNR) and to avoid possible changes in the sidelobes.

FIG. 7a illustrates the situation in which the coarse range estimate does not coincide with the actual range. In FIG. 7a, waveform portions 750, 752, and 756 represent the returned signal reflected from the target due to earlier transmission of pulse portions 50, 52, and 56, respectively, of FIG. 4. Note that portions 51 and 53 of the pulse of FIG. 4 represent nontransmission periods, so no return is received in the intervals T710–T714 of portion 751, and T718–T722 pulse portion 750 ends at time T710, and no signal is received in the interval T710–T714. Similarly, pulse portion 752 is received in the interval T714–T718, and no signal is received in the interval T718–T722.

In FIG. 7a, the delayed reference waveform applied to conductor 570 (FIG. 5) is illustrated by chain-line portions 760, 765, 767, 761, 762, 769, 763, 766 and 785. If the reference signal were to be completely identical to the transmitted signal, it would include portions 760 and 765 in the interval extending to time T712, it would not include swept-frequency portion 767, but would remain at a constant frequency from time T712 to T716. Further, the reference waveform would include portions 762 and 769 in the interval T716–T720, but would not include swept-frequency portion 785, but would again remain at a constant frequency from time T720 to time T724, and would be followed by portion 766 following time T724. The reference signal as modified therefore includes extended swept-frequency portions 767, 761, 785 and 763. The reference signal is not turned off during swept-frequency portions 760, 765, 762, 769, and 766, nor is it turned off during extended swept-frequency portions 767, 761, 785 and 763, nor between portions 767 and 761; 769 and 763. In order to allow for range errors, swept-frequency portions 760, 765 and an extension 767 of the reference waveform end at time T713, extended swept-frequency portion 761 extends from T714 to T716, a further swept-frequency portion 762, 769 extends from time T716 to T720, an extension 785 extends to time T721, an extended swept-frequency portion 763 extends from time T722 to time T724, and a further swept-frequency portion begins at time T724. Solid-line waveform 764 of FIG. 7b represents the theoretical amplitude of the reflected signal of FIG. 7a, and dashed-line portion 766 of FIG. 7b represents the reference waveform amplitude. Phase detector 530 of FIG. 5 responds to the reflected and reference waveforms to produce I and Q signals which, together, have amplitude-and frequency-time distributions illustrated as 768 and 770, respectively, of FIGS. 7c and d.

DFT processor 560 includes a plurality of frequency filters which correspond to incremental frequency differences between the reference waveform and the return from the target. In the absence of Doppler frequency shifts attributable to motion of the target, these frequency filters receive signals which correspond to different ranges, and which therefore do not return exactly in coincidence with the reference waveform (which in fact is why there is a frequency difference). Thus, the various difference frequencies produced by phase detector 530 actually arrive at slightly different times. For example, a difference frequency of zero means that the coarse range estimate was correct, and the return arrives exactly in coincidence with the reference waveform. The largest difference frequency means that the coarse range estimate was so different from the actual range that a fairly large time difference occurs between the return and reference waveforms. The receiver of FIG. 5 for a particular DFT filter enables particular ones of gates 550 and 552 during the portions.

The gating for each DFT filter is different. FIG. 7e illustrates the gating waveform for the zero frequency filter, since that filter is assumed to be for a signal from the phase detector aligned to the central portion of the reference waveform, i.e., a signal whose range delay exactly equals the assumed value. FIG. 7f illustrates the gating waveform which would be applied to that filter which accepts the difference frequency for the signal represented by the solid line of FIG. 7a. The amplitude of the signal gated through the appropriate gates 550, 552 by the gating waveform in FIG. 7f is as illustrated by waveform 776 of FIG. 7g. As illustrated, there is a gap from times such as T710 until T714 and T718 to T722 during which the reflected signal goes to zero corresponding to resteering periods.

During those intervals in which a particular DFT filter does not receive clock signals, it does not respond to input signals. For example, the zero frequency filter of DFT block 560 is not aware of the existence of time intervals T712–T716 and T720–T724 of FIG. 7, and does not respond in any way to signal applied, or to lack of signal, in that interval.

FIG. 8a illustrates an amplitude-time waveform 810 having a constant amplitude. FIG. 8a represents an output from phase detector 530 of FIG. 5 with no difference in timing between the reflected and reference signals applied to the phase detector as seen by DFT block 560. This corresponds to the condition in which the coarse range estimate happens to be correct. The output from the phase detector is therefore a direct voltage (zero frequency). In FIG. 8a, times T712 and T716 are illustrated as superposed, as are times T720 and T724. They are superposed because, in the intervals T712–T716 and T720–T724, clock signals are not applied to DFT block 560, and therefore it is not aware of the hiatus. Processing therefore is performed on dc signal 810 as though it had no gaps.

FIG. 8b illustrates the signal seen by the portion of DFT 560 including the filter matched to the particular range error of FIG. 5 when the coarse range estimate is in error. The filter input is an uninterrupted sinusoid. Let us return to the case where the signal delay exactly equals the assumed delay. As shown in FIG. 8a, the input to the zero frequency filter of the DFT is a block of direct voltage.

Now consider the input to some other filter in the DFT. The filter gate is set to correspond to a range offset that would result in the frequency of that filter. FIG. 9a shows the signal and reference. FIG. 9b shows the amplitude and FIG. 9c shows the frequency of the output from the phase detector. FIG. 9d shows the gating signal for a filter whose frequency corresponds to a signal with less delay, and FIG. 9e shows the resulting-signal processed by that filter. The signal as seen by the filter is shown in FIG. 10. In FIG. 10, 1000 represents a sinusoidal signal whose frequency is the difference frequency delta ($\Delta$) illustrated in FIG. 7a, the amplitude of which periodically drops to zero in intervals T14–T16 and T22–T24. This effectively pulse-modulates the phase-detected signal with a pulse duration which depends upon the position of the gating signal. The modulation in turn creates sidebands of sinusoid 1000. If appreciable harmonic level exists at the frequency of the filter there will be an output in that filter even though the target is not at the range to which that filter is matched. That is, the signal has a range sidelobe. These low-level responses are spurious responses or sidelobes which may obscure actual range responses of other targets.

FIG. 11 is a plot of a computer simulation of the time sidelobes generated for a receiver such as that of FIG. 5 in response to a periodic frequency-jump waveform such as that illustrated in FIG. 7a with 40 subpulses, each of 2.5 μS duration and bandwidth 25 MHz, with Hamming amplitude weighting of the pulse, with 2 μS resteering periods and no Doppler error. As illustrated in FIG. 10, peaks in the response are only about 24 dB down from the reference peak amplitude of −1.3 dB. When two or more targets are to be tracked which have similar but not identical ranges, such range sidelobes of a large target can obscure the detection and/or prevent accurate measurement of the range of a smaller target. For example, an airplane which reflects a radar signal producing a relatively large-amplitude summed return such as that of FIG. 11 with sidelobes, may obscure or distort a smaller-amplitude return from a missile having a range corresponding to a time error near 0.2 μS or 2.2 μS of FIG. 11. Thus, range sidelobes may give rise to errors in ranging.

SUMMARY OF THE INVENTION

A method for determining the range of a distant target according to the invention includes the steps of steering the phase control elements of an array antenna to direct it toward the target. A sequence of transmitter pulses is applied to the antenna. Each of the pulses includes a plurality of sequential subpulses having nonuniform duration mutually separated by nontransmitting periods of constant duration. During the period between transmitted pulses, the signal returned from the target is processed by downconversion by a reference signal to produce range information.

DESCRIPTION OF THE DRAWINGS

FIG. 8a is a plot of the signal as seen by the digital Fourier transformer of FIG. 5 with zero coarse range error, and FIG. 8b is the same plot with a range error;

FIGS. 9a–9e are plots similar to those of FIGS. 7a–f under different conditions;

DESCRIPTION OF THE INVENTION

Figure 12:
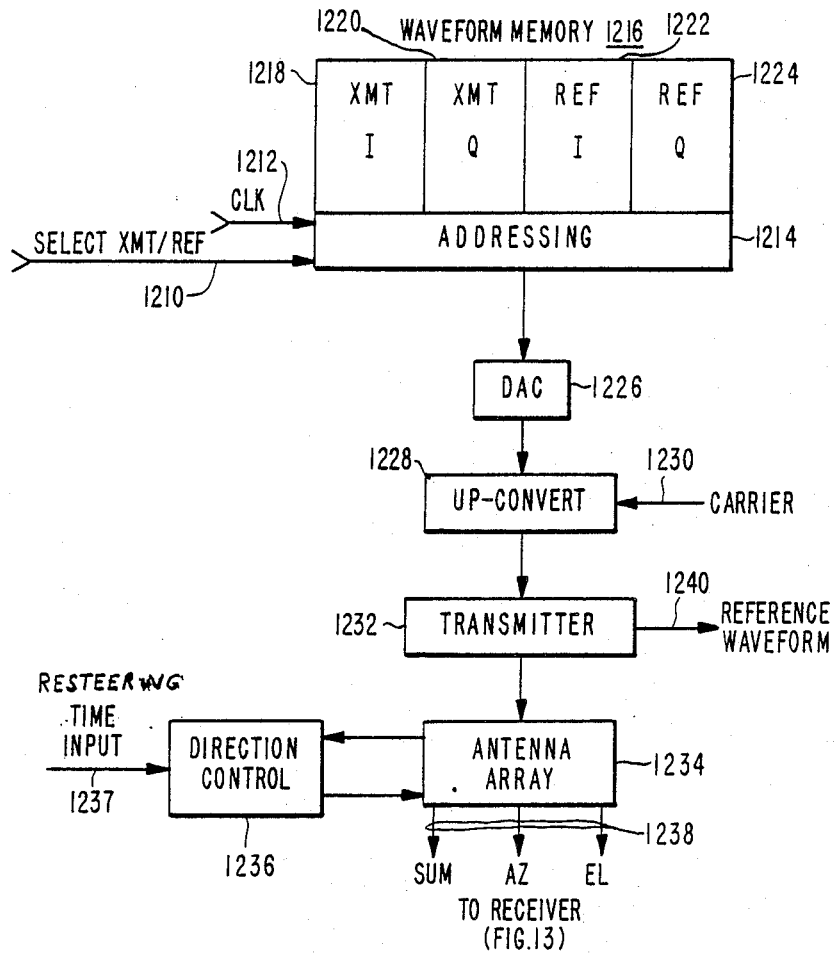
FIG. 12 is a simplified block diagram of a portion of a radar system according to the invention in which the transmitter is adapted for generating pulses comprising subpulses of nonuniform duration.

FIG. 12 is a simplified block diagram of the transmitting portion of the radar system in accordance with the invention. In FIG. 12, a SELECT TRANSMIT OR REFERENCE (XMT/REF) control signal is applied over a conductor set 1210 and clock signal is applied over a conductor 1212 to the address control portion 1214 of a memory arrangement designated generally as 1216. Memory arrangement 1216 includes separately addressable page portions 1218, 1220, 1222 and 1234 which, when addressed sequentially, produce a sequence of digital signals representing the I and Q components of the transmitted and reference waveforms.

Figure 14:
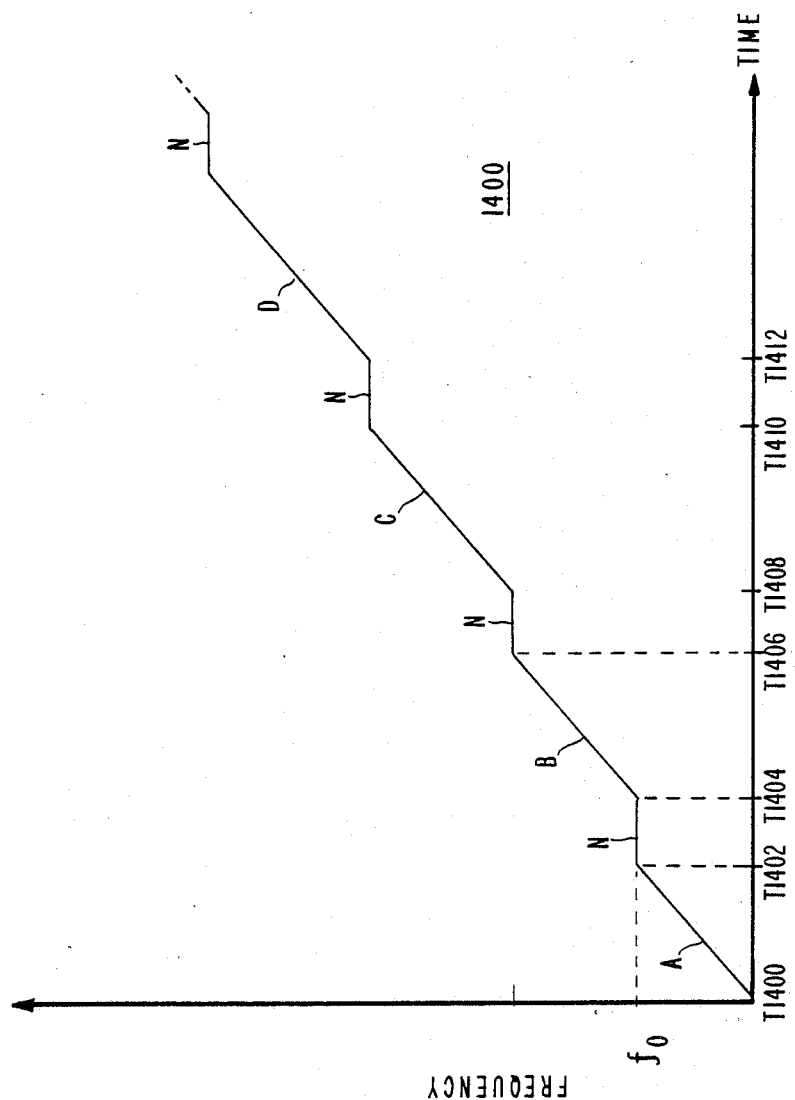
FIG. 14 is a plot similar to FIG. 4, in which the transmitter pulses include subpulses of nonuniform duration.

Memory portions or pages 1218 and 1220 are preprogrammed with the baseband I and Q components of a transmitter pulse illustrated as 1400 of FIG. 14, consisting of sequential subpulses A, B, C . . . separated by constant-duration nontransmitting portions N. The sequential subpulses A, B, C . . . are not of constant duration, but may be of progressively increasing, progressively decreasing, or mixed durations. In the particular embodiment of FIG. 14, the subpulses A, B, C . . . defined by digital words read from memory have durations T1400–T1402; T1404–T1406; T1408–T1410; . . . which increase monotonically to a duration of 1.01 times the duration of the preceding subpulse.

Figure 7:
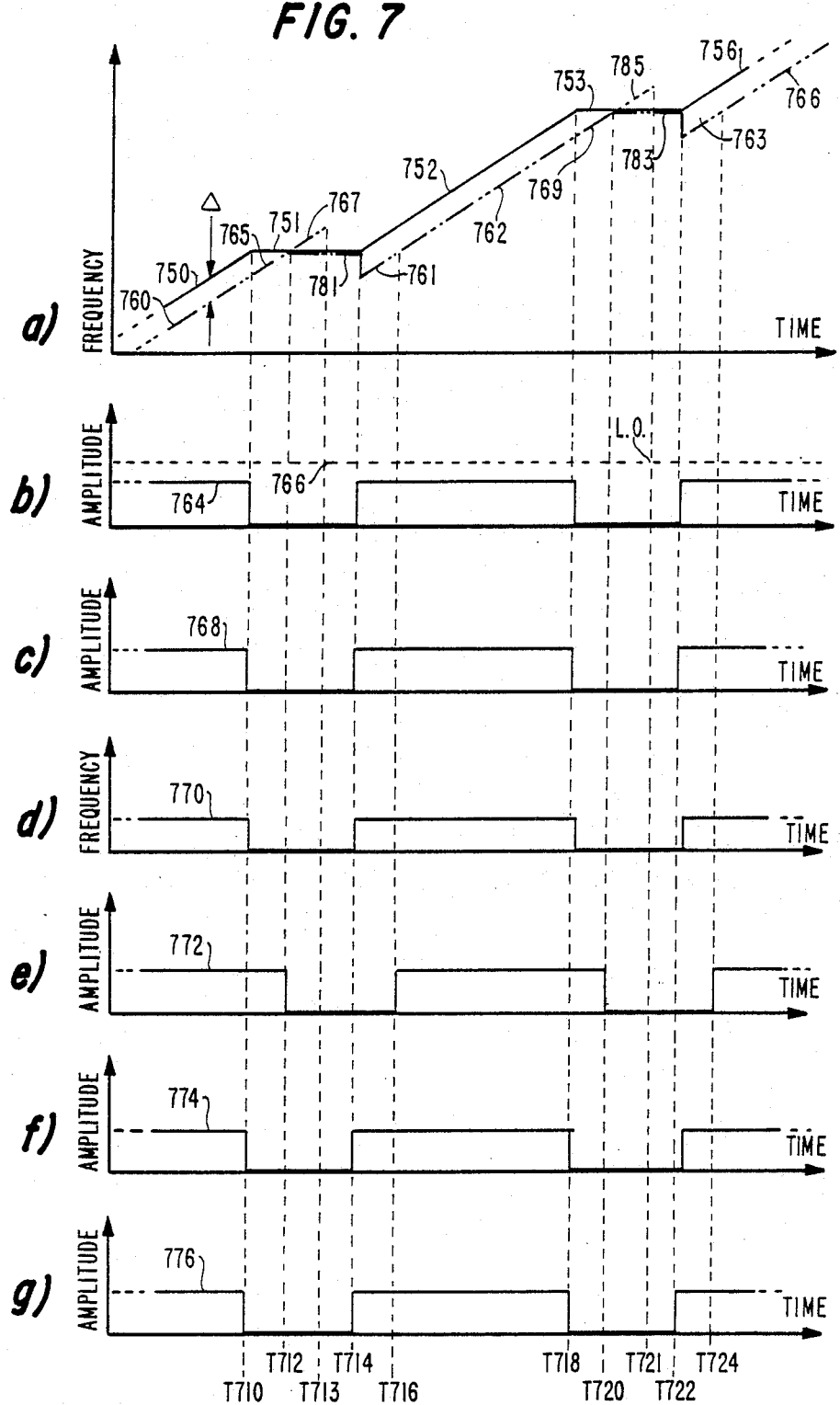
FIGS. 7a–7g illustrate frequency or amplitude-time plots of periodic-subpulse swept-frequency pulses with nontransmitting periods, and various representations of the signals occurring in the receiver of FIG. 5 during reeeption.
Figure 10:
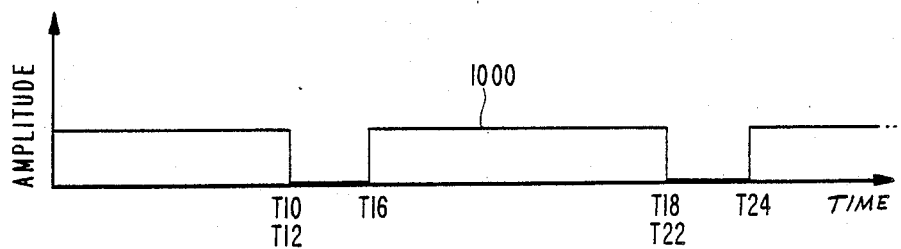
FIG. 10 represents the amplitude of a sinusoidal difference frequency.

Memory portions 1222 and 1224 are preprogrammed with the baseband I and Q components of a reference pulse in which the subpulses are widened, as described in conjunction with FIG. 7a, relative to the subpulses produced by memory portions 1218 and 1220.

When commanded, the digital signals are read from memory portions 1212 and 1220, and applied to a digital-to-analog converter (DAC) 1226, which converts the digital signal to an analog equivalent. The digital signals, whether representing transmitter pulses or reference pulses, are applied to an up-converter 1228 which receives a carrier over a conductor 1230 to convert the baseband signal to the transmitter frequency. The up-converted pulse from up-converter 1228 is applied to a transmitter 1232 which amplifies the power for application to an antenna array illustrated as a block 1234. Antenna array 1234 is steered by a direction control illustrated as a block 1236 which receives inputs from the tracking computer described below, which inputs include signals representing the time at which a return is expected from the target or targets. Antenna 1234 receives each high-power transmitter pulse from transmitter 1232 and transmits it in the direction commanded by direction control 1236.

At a time following the transmission of each transmitter pulse, a return is received by antenna array 1234, and analog processing is performed to produce sum, azimuth and elevation difference signals, and other signals as appropriate, such as sidelobe signals. These analog signals are applied by way of conductors represented together as 1238 to a receiver, illustrated in FIG. 13.

Figure 13:
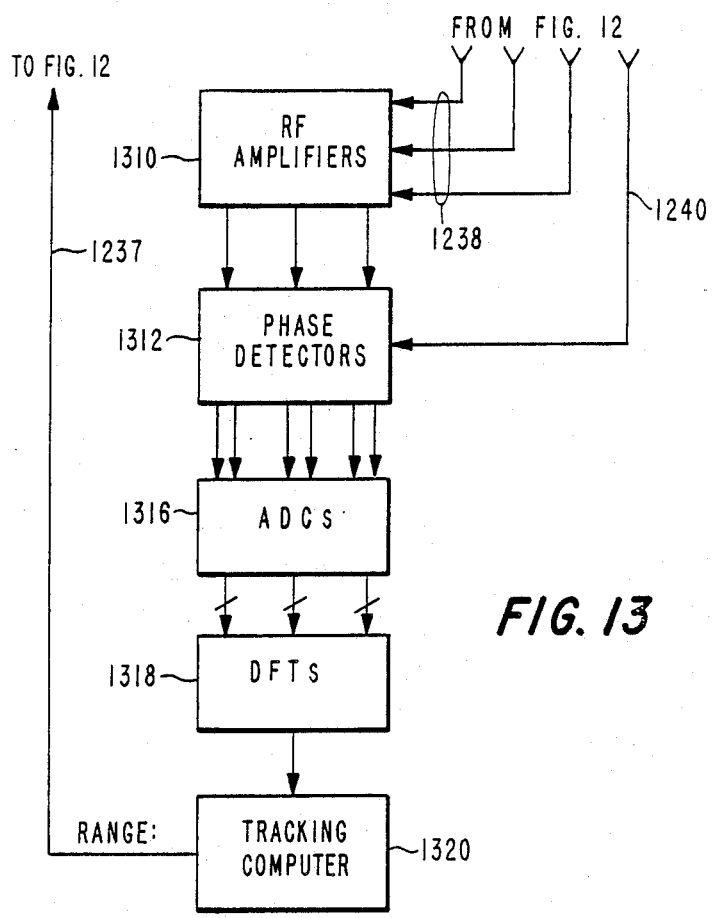
FIG. 13 is a simplified block diagram of another portion of the radar system of FIG. 12.

Near the time at which the target return is expected, the SELECT XMT/REF signal on conductor 1210 commands generation of the reference signal, which is sampled and applied over a conductor 1240 to the receiver of FIG. 13.

FIG. 13 is a simplified block diagram of a receiver used in conjunction with the arrangement of FIG. 12. In FIG. 13, conventional monopulse received signals representative of sum, elevation difference, and azimuth difference signals are applied from conductors 1238 to RF amplifiers illustrated together as a block 1310. The amplified signals are applied to a phase detector illustrated as 1312 which receives the reference signal over conductor 1240 for down-converting the received signal to baseband for producing baseband in-phase (I) and quadrature (Q) components from each of the sum, elevation difference, and azimuth difference signals received from RF amplifiers 1310. The analog signals produced by phase detectors 1312 are applied to a set of analog-to-digital converters (ADC) illustrated together as a block 1316 which convert the I and Q baseband signals to corresponding digital signals which are in turn applied to a set of Digital Fourier transformers (DFT) illustrated together as a block 1318. The DFT output information includes target range error information which is applied to a target tracking computer illustrated as 1320 which keeps track of the range of each target and which produces range information, based on a selected target, which is applied to direction control 1236 of FIG. 12 at the beginning of the expected time of arrival of return information. The range information corresponds in time to the coarse range estimate.

Figure 11:
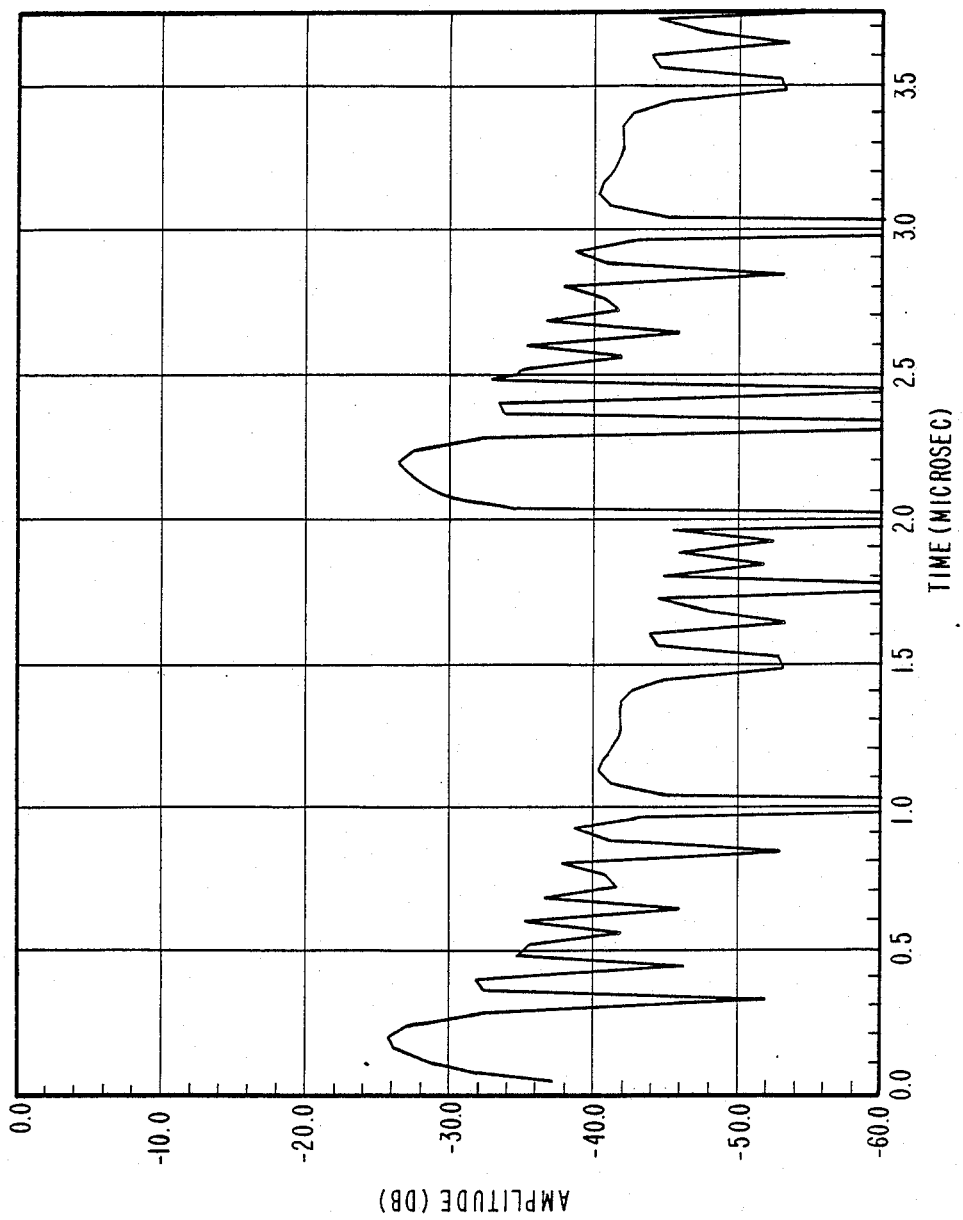
FIG. 11 is an amplitude-time plot of the output of the digital Fourier transform of FIG. 5 with periodic frequency-jump transmitted pulse and a range error.
Figure 15:
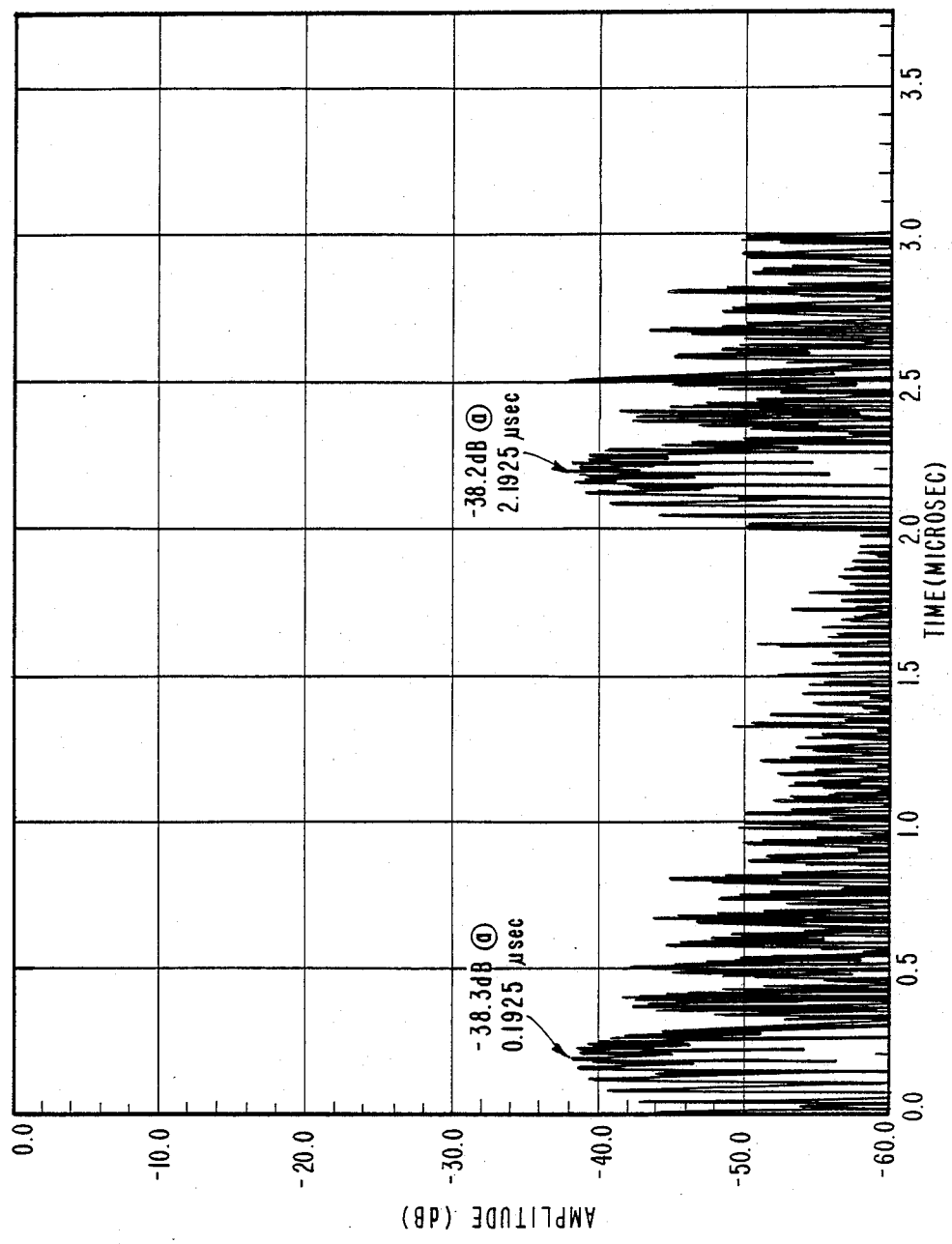
FIG. 15 is a plot similar to that of FIG. 11 illustrating the effect on the range sidelobes of changing the subpulse duration.

FIG. 15 illustrates the result of transmitting 40 subpulses per pulse, each subpulse having a duration equal to 1.01 times that of the previous subpulse, with the initial subpulse having a duration of 2.0 μS. The corresponding bandwidth of the first subpulse is 20 MHz, increasing by a factor of 1.01 on each successive subpulse. As illustrated in FIG. 15, the peak sidelobe is greater than 38 dB down, an improvement of at least 10 dB over FIG. 11. In general, the improvement is of the order of 10 log(N) where N is the number of subpulses.

Figure 1:
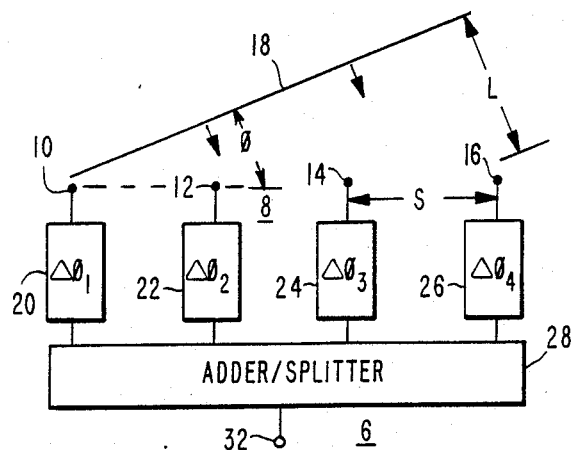
FIG. 1 is a block diagram of an array antenna illustrating its relationship to a plane wavefront.
Figure 2:
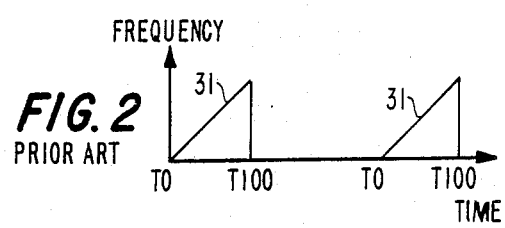
FIG. 2 illustrates linear frequency FM transmitter pulses which may be applied to the antenna of FIG. 1 or which may be returned from a target.
Figure 3:
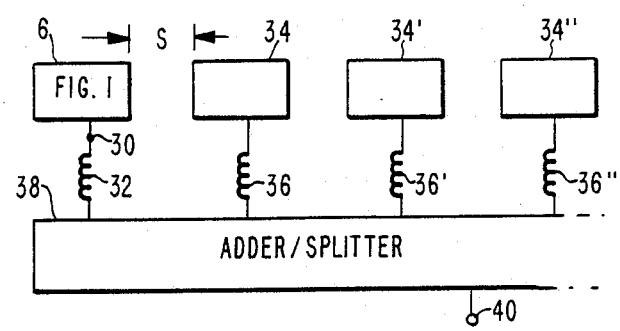
FIG. 3 illustrates an array of antennas such as that illustrated in FIG. 1 interconnected by delay lines.
Figure 4:
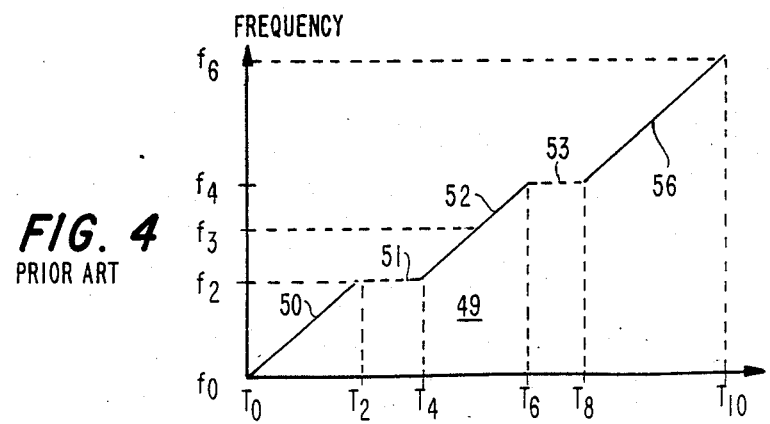
FIG. 4 is a frequency-time plot of a swept-frequency pulse illustrating constant-duration subpulses interspersed with nontransmitting times during which the antenna may be resteered.
Figure 5:
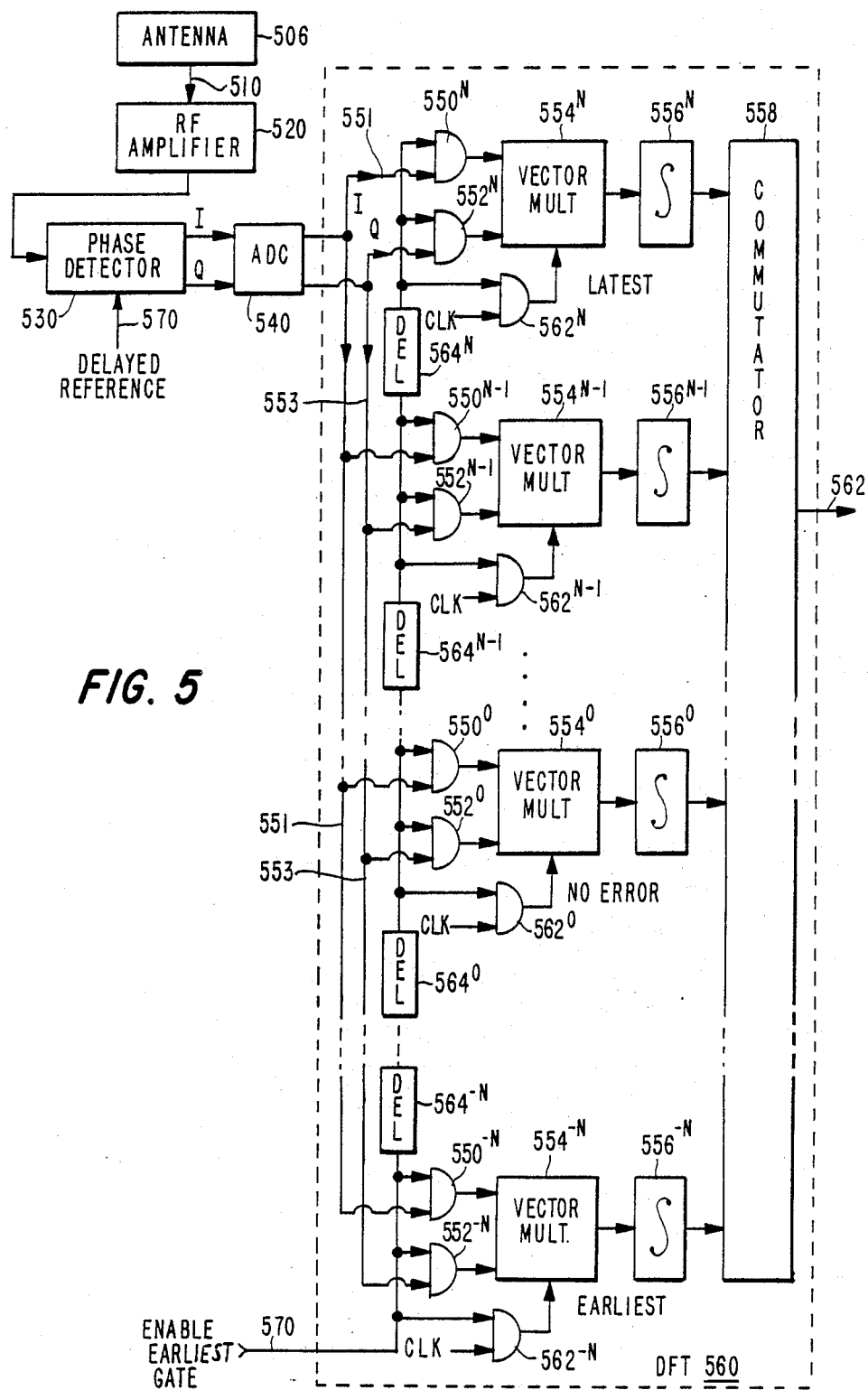
FIG. 5 is a simplified block diagram of a radar receiver.
Figure 6:
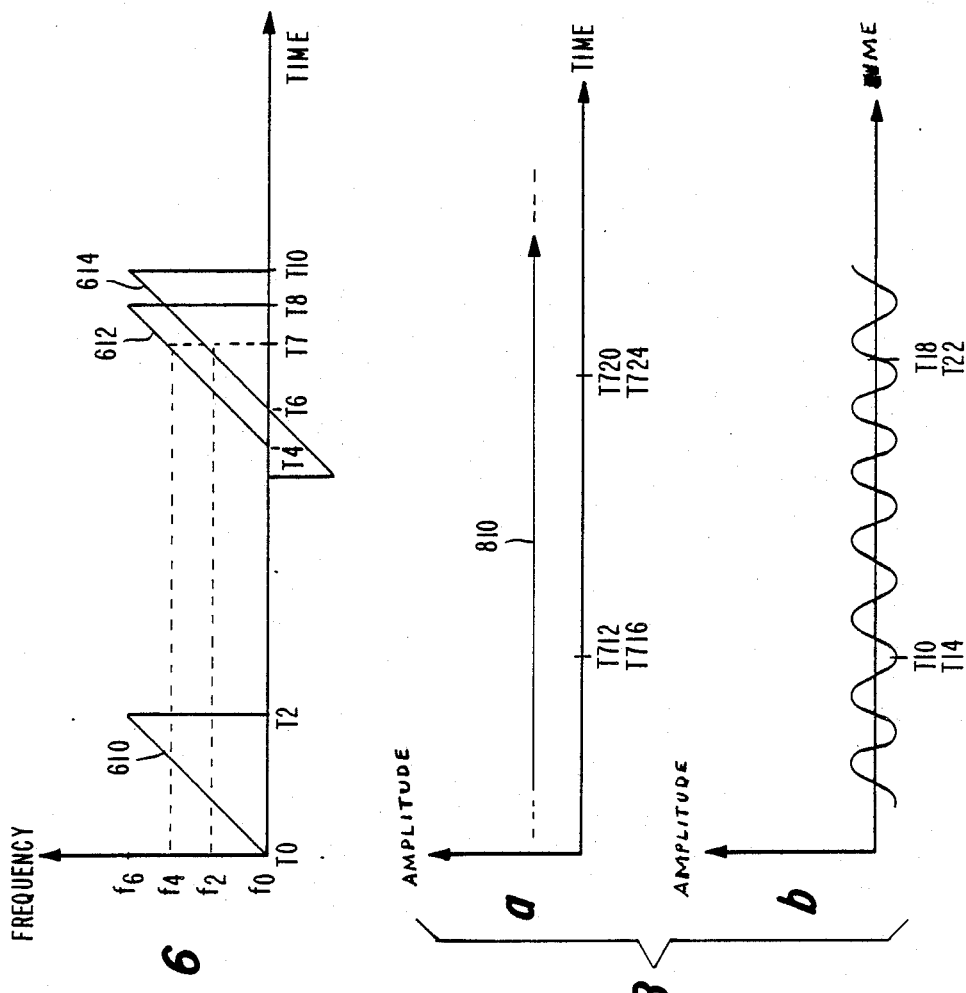
FIG. 6 is a frequency-time plot of swept-frequency transmitted, reflected and reference pulses which relate to the receiver of FIG. 5.

Other embodiments of the invention will be apparent to those skilled in the art. In particular, antenna array 6 of FIG. 1 has been illustrated as a line array including four omnidirectional antennas. More than four antennas may be used, which may be arranged as known in a two-dimensional array. Each individual element 10–16 may have a directional pattern. Each antenna element 10–16 may be linearly, elliptically or circularly polarized. There may be separate transmit and receive antennas (bistatic operation). Those skilled in the art know that multiple targets may require generation of replicas of the transmitter pulse at various times between transmitter pulses. If very large numbers of targets are to be tracked, it may be desirable to simply divide the transmitter pulse into a corresponding number of channels, and provide a variable delay in each channel, which delay is selected in order to cause the delayed pulse to become available to the signal processing at the time the return signal is expected. The returned signal may be downconverted and amplified by a wideband intermediate frequency amplifier prior to phase detection.

What is claimed is:

1. A method for determining the range of a distant target, comprising the steps of:

steering the phase control elements of an array antenna to direct the antenna beam toward the target;

applying a sequence of pulses of carrier to said antenna for transmission, each of said pulses including a plurality of sequential subpulses, each of said subpulses being of carrier of monotonically changing frequency, said plurality of subpulses having nonuniform durations and being separated by nontransmitting periods of constant duration;

estimating the range to said target, and for each of said pulses generating a reference signal comprising at least a part of said plurality of sequential subpulses at a time corresponding to the expected time of return of a reflection from said target;

in the period between said pulses, receiving returned signal from said target and phase detecting said returned signal by use of said reference signal to produce phase detected signals including information relating to the error between the actual range and the estimated range; and Fourier transforming said phase detected signals to generate range error information.

2. A method according to claim 1 further comprising the step of resteering said antenna during each of said nontransmitting periods.

3. A radar transmitter-receiver apparatus, comprising:

directive electromagnetic signal radiating means;

a source of signals coupled to said radiating means for generating pulses, each of which comprises a plurality of separated subpulses, each of said subpulses comprising a monotonically swept-frequency portion, each of said subpulses having a duration which differs from that of a least some of the other subpulses of said pulse.

4. An apparatus according to claim 3, wherein said source of signals generates said subpulses in such a manner that the frequency at the end of one subpulse is substantially equal to the frequency at the beginning of the next following subpulse.

5. An apparatus according to claim 3, wherein said source of signals generates said subpulses with a uniform duration time separation therebetween.

6. An apparatus according to claim 5, wherein said source of signals generates said subpulses in such a manner that the frequency at the end of one subpulse i substantially equal to the frequency at the beginning of the next following subpulse.

7. An apparatus according to claim 5, wherein said source of signals generates each of said subpulses with a duration unequal to that of any other subpulse of said pulse.

8. An apparatus according to claim 7 wherein said source of signals generates said subpulses with a duration which changes monotonically during said pulse.

9. An apparatus according to claim 8 wherein said source of signals generates said subpulses with a duration which increases monotonically during said pulses.

10. An apparatus according to claim 9 wherein said source of signals generates said subpulses with a duration which is 1% greater than the duration of the preceding subpulse.

11. An apparatus according to claim 10 wherein said source of signals generates 40 subpulses during each pulse.

12. An apparatus according to claim 3 wherein said antenna is an array antenna.

* * * * *